United States Patent
Vezzoli

(10) Patent No.: US 11,007,581 B2
(45) Date of Patent: May 18, 2021

(54) DEVICE FOR THE PRECISE ANGULAR POSITIONING OF TOOL-HOLDERS SUITABLE FOR CNC MACHINES AND TOOL-HOLDERS EQUIPPED WITH SUCH DEVICE

(71) Applicant: ALGRA S.P.A., Val Brembilla (IT)

(72) Inventor: Giovanni Vezzoli, Via Brembilla (IT)

(73) Assignee: ALGRA S.P.A., Val Brembilla (IT)

( * ) Notice: Subject to any disclaimer, the term of this patent is extended or adjusted under 35 U.S.C. 154(b) by 63 days.

(21) Appl. No.: 16/010,622

(22) Filed: Jun. 18, 2018

(65) Prior Publication Data

US 2018/0369930 A1  Dec. 27, 2018

(30) Foreign Application Priority Data

Jun. 21, 2017  (IT) .................. 102017000068900

(51) Int. Cl.
| | |
|---|---|
| B23B 29/00 | (2006.01) |
| B23B 29/03 | (2006.01) |
| B23B 27/16 | (2006.01) |
| B23B 31/107 | (2006.01) |
| B23B 31/20 | (2006.01) |
| B23Q 3/12 | (2006.01) |
| B23Q 3/18 | (2006.01) |

(Continued)

(52) U.S. Cl.
CPC ............ *B23B 31/207* (2013.01); *B23B 29/04* (2013.01); *B23B 29/205* (2013.01); *B23Q 3/12* (2013.01); *B23Q 3/18* (2013.01); *B23Q 17/22* (2013.01); *B23Q 39/044* (2013.01); *B23B 2265/12* (2013.01); *B23B 2270/12* (2013.01)

(58) Field of Classification Search
CPC . B23B 2265/12; B23B 2270/12; B23B 29/04; B23B 29/205; B23B 31/207; B23B 27/16; Y10T 407/2222; B23Q 17/22; B23Q 39/044; B23Q 3/12; B23Q 3/18
See application file for complete search history.

(56) References Cited

U.S. PATENT DOCUMENTS 3,705,448 A * 12/1972 Bansen .................. B23D 43/04
                                                     407/17
5,947,658 A *  9/1999 Eysel ................ B23B 29/03457
                                                    408/147

(Continued)

FOREIGN PATENT DOCUMENTS

WO    WO-2015145345 A1 * 10/2015 ......... B23Q 17/2428

*Primary Examiner* — Sara Addisu
(74) *Attorney, Agent, or Firm* — Abelman, Frayne & Schwab

(57) ABSTRACT

A device for the precise angular positioning of tool-holders includes a front part, a rear part, and a plug cooperating with a pair of pins arranged orthogonally relative to the plug. A first portion of the plug is inserted in a blind hole formed in the front part and a second portion of the plug is inserted in a corresponding blind hole formed in a front area defining a plate on the rear part of the tool-holder. The plate of the rear part has an upper surface in which a pair of bored holes is formed having equal diameters and depths. The bored holes extend vertically in the plate and orthogonally relative to the plug. A pin is rotatably inserted in each of the pair of bored holes to selectively rotate the plug in a clockwise or counterclockwise direction to orientate the front part relative to the rear part.

5 Claims, 4 Drawing Sheets

(51) Int. Cl.
  *B23B 29/20* (2006.01)
  *B23Q 17/22* (2006.01)
  *B23B 29/04* (2006.01)
  *B23Q 39/04* (2006.01)

(56) References Cited

U.S. PATENT DOCUMENTS

| | | | | |
|---|---|---|---|---|
| 7,013,774 | B1* | 3/2006 | Allart | B23B 29/16 82/157 |
| 10,150,192 | B1* | 12/2018 | Navarro, Sr. | B23Q 3/186 |
| 10,150,194 | B1* | 12/2018 | Navarro, Sr. | B23Q 17/2275 |
| 2002/0035902 | A1* | 3/2002 | Ericksson | B23B 29/04 82/158 |
| 2003/0175088 | A1* | 9/2003 | Matsumoto | B23B 31/026 409/234 |
| 2009/0214303 | A1* | 8/2009 | Haimer | B23B 31/1179 407/36 |
| 2016/0175943 | A1* | 6/2016 | Judas | B23B 29/248 82/159 |
| 2018/0221965 | A1* | 8/2018 | Vezzoli | B23B 31/107 |
| 2018/0326511 | A1* | 11/2018 | Vezzoli | B23B 31/1073 |
| 2019/0001456 | A1* | 1/2019 | Kalhori | B23B 31/305 |
| 2019/0078868 | A1* | 3/2019 | Grossmann | G01B 5/25 |
| 2019/0086241 | A1* | 3/2019 | Joachimsthaler | G01D 5/2451 |

* cited by examiner

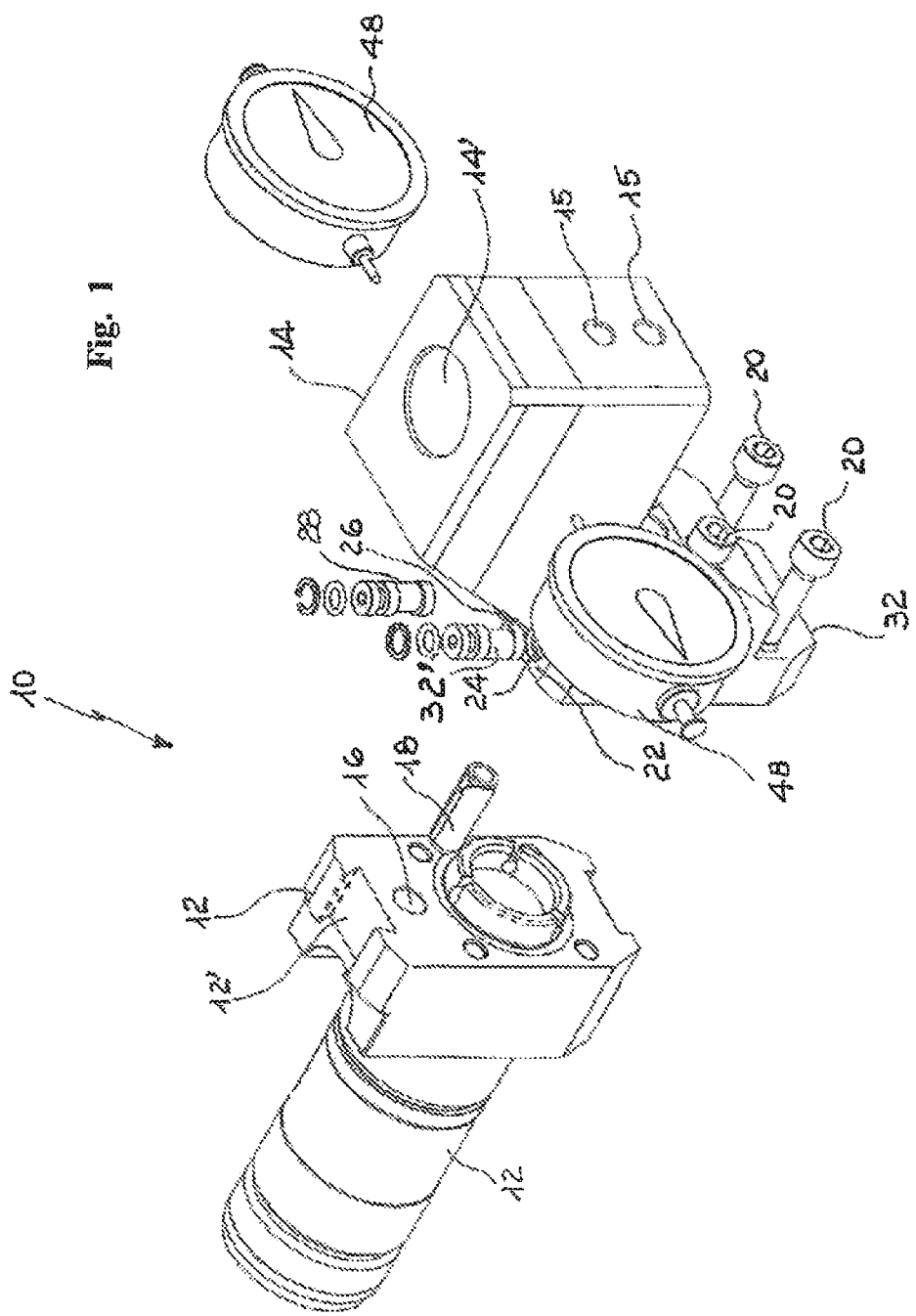

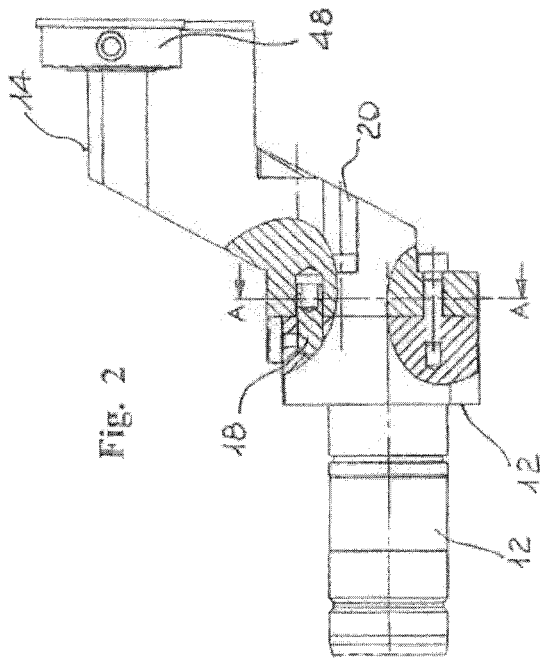
Fig. 2
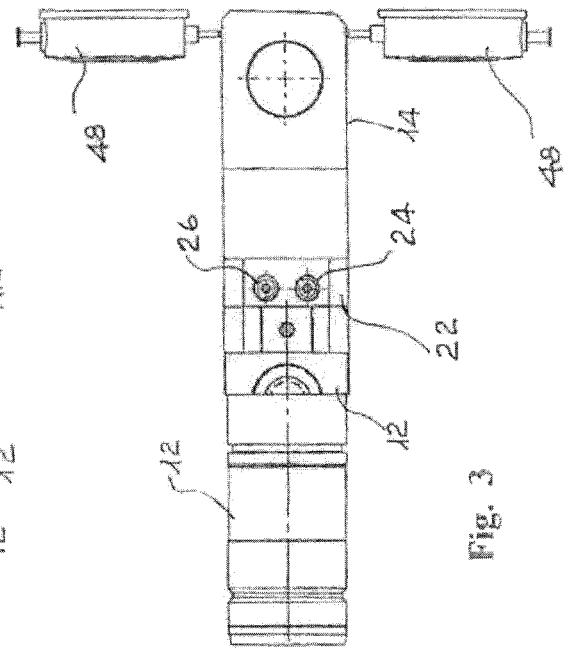
Fig. 3
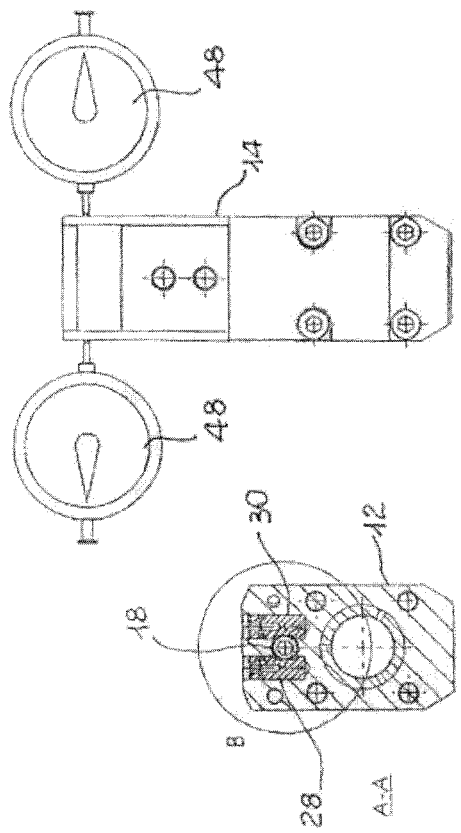
Fig. 4
Fig. 5
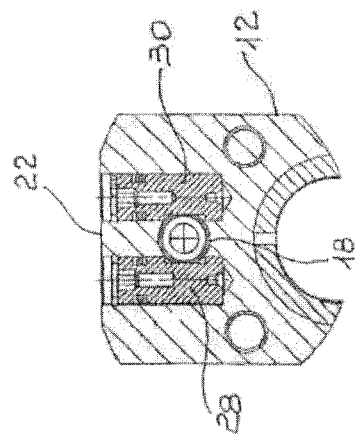
Fig. 6

DEVICE FOR THE PRECISE ANGULAR POSITIONING OF TOOL-HOLDERS SUITABLE FOR CNC MACHINES AND TOOL-HOLDERS EQUIPPED WITH SUCH DEVICE

The present invention relates to a device for the precise angular positioning of tool-holders suitable for CNC machines.

More in particular, the present invention relates to a device suitable to achieve the precise positioning of tool-holders suitable for angular machining on CNC single spindle or multi-spindle lathes, on transfer machines, milling centres of any kind and, in general, on machine tools which perform machining by chip removal. The invention also relates to a tool-holder equipped with said angular positioning device.

It is known that in the context of mechanical machining carried out with CNC machine tools of any kind there is a need to frequently replace the various modules, as needed at the time to obtain the required pieces.

Repeated equipment replacement operations involve dead times, where the operation of the machine is compulsorily suspended for a given period; it is also necessary to consider set-up times at each tool replacement. In the case of machines equipped with tool-holders intended for certain machining, there is also a need to carry out a precise angular positioning of said tool-holders, so as to carry out extremely precise operations on the pieces and with extremely low tolerances. In this respect, the known methods involve long and extremely laborious operations. First of all such operations require great skill and can therefore only be carried out by highly qualified personnel; secondly, specific equipment, such as not immediately manoeuvrable shift levers of one or other of the components are needed in order to correctly perform said operations to achieve precise angular positioning.

From the German patent DE 10 2008 048206 a revolver tool is known of comprising a disc rotating around an axis, in which a plurality of tool stations are distributed along its circumference. According to this solution, a blade is supported on a face of a seat in contrast to a pressure force, while a second blade bears on the outer side an adjustment body.

In relation to the CNC machine tools mentioned above the need is widely felt to have an increasing number of tool-holders, which are also replaced with frequency according to the various machining; as a result the repeated and complex manual operations that are currently necessary to retool said machines, with the technical times in which their operation is forcibly interrupted, give rise to significant increases in overall production costs. Furthermore, precisely on account of the difficulties that the replacement of the tool-holder involves, the related operations require intervention by qualified personnel.

The purpose of the present invention is to overcome the drawbacks complained of above.

More particularly, the purpose of the present invention is to provide a device for the precise angular positioning of tool-holders suitable for CNC machines which allows such positioning to be carried out easily and quickly, thus avoiding the need to stop production for long periods.

A further purpose of the invention is to provide a device as defined above that makes it possible for even non-skilled personnel to quickly perform the precise angular positioning of the tool-holders installed on CNC machines.

A further purpose of the invention is to provide a tool-holder equipped with said device.

A further purpose of the invention is to make available to users a precise angular positioning device of tool-holders suitable to ensure a high level of resistance and reliability over time, in addition such as to be easily and economically made.

These and other purposes are achieved by the angular positioning device of the present invention according to the main claim.

The construction and functional characteristics of the precise angular positioning device of tool-holders suitable for CNC machines of the present invention will be more clearly comprehensible from the detailed description below in which reference is made to the appended drawings which show a preferred and non-limiting embodiment and wherein:

FIG. 1 schematically represents, in an exploded view, the angular positioning device of the present invention and a tool-holder with which said device is paired;

FIG. 1A schematically represents, in an exploded view, a part of the angular positioning device of the present invention, in an axonometric view from the opposite side relative to the representation in FIG. 1;

FIG. 2 schematically represents a side view partially in cross-section of a tool-holder incorporating the angular positioning device of the present invention;

FIG. 3 schematically represents a plan view of the tool-holder in FIG. 2 incorporating the angular device of the invention;

FIG. 4 is a schematic front view of the tool-holder in FIG. 2;

FIG. 5 schematically represents a longitudinal cross-section along the line A-A in FIG. 2, highlighting the angular positioning device of the invention housed in the relative tool-holder;

FIG. 6 is a partial enlargement of FIG. 5;

Figure 1A:
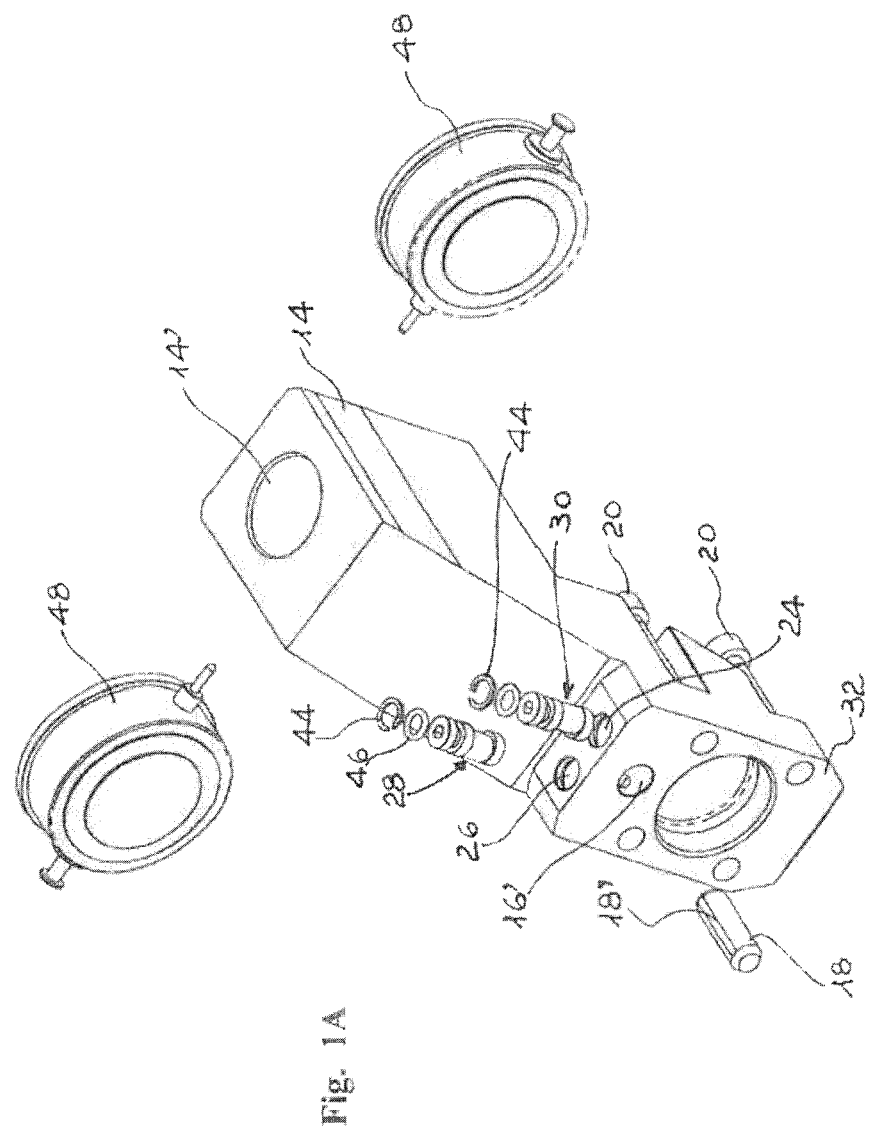

With initial reference to FIG. 1, the angular positioning device of the present invention is advantageously paired with a tool-holder globally denoted by reference numeral 10, motorised or non-motorized, comprising a front part 12 and an opposite rear part 14. Said latter is conventionally provided with upper and lower opposite openings, the first of which is denoted as 14' in FIGS. 1 and 1A, for housing the tool (not shown) which is kept in place by means of screws or grains, inserted in special radial seats 15 arranged on said rear part 14 of the tool-holder 10.

According to the invention, the front part 12 or anchor base is the attachment intended to be attached to the machine tool performing machining by chip removal, for example by means of the dovetail coupling 12' in FIG. 1; said front part 12 is provided with a blind hole 16, in which a semi-part of a plug 18 is pressure-inserted; the remaining semi-part of the plug 18 is inserted in a corresponding hole indicated as 16' in FIG. 1A, made on the front area of said rear part 14. Said rear part 14 is constrained to the front part 12 by conventional screws 20. As noted in particular in FIG. 1, as well as in FIGS. 1A, 2 and 3, said front area of the rear part 14 of the tool-holder 10 is defined by an embossed plate 32, parallel to the front part 12, which forms a plane 22 above; starting from said plane 22 in the aforementioned embossed plate 32 of the tool-holder 10, two paired bored holes 24, 26, are made, having the same diameter and depth. The bored holes 24 and 26 extend vertically in the embossed plate 32 of the tool-holder 10 orthogonally relative to the orientation of the plug 18 and for a height such as to exceed said plug, as may be seen in particular in FIGS. 1A, 5 and 6. The holes 24 and 26 are designed to receive as many pins 28, 30, illustrated in detail in FIG. 7 together with the plug 18. Said latter is provided with a conventional groove 18' extending longitudinally, which allows the venting of air at the moment it is inserted in the blind holes 16 of the front part 12 and 16' of the rear part 14 of the tool-holder 10.

Each of said pins 28, 30 comprises a cylindrical central portion 32' and opposite upper 34 and lower bases 36 equally cylindrical; said bases, of lower height than the cylindrical central portion 32', are made integrally therewith, with respect to which they have a larger diameter. Above the top base 34 of the individual pins 28 and 30 an integral head 38 is made provided with a shaped recess 40 for a spanner, preferably for a so-called hexagonal male Allen type spanner, not illustrated inasmuch as known. Between the top base 34 and the head 38 of the pins 28, 30 a notch 42 is made which houses an elastic ring 44 having the function of retaining said pins in the respective seats, consisting of the bored holes 24, 26.

Preferably, below the elastic ring 44, in each of the notches 42 a gasket or toric ring 46 is placed, designed to prevent that in the bored holes 24 and 26 intended to receive the pins 28, 30 possible slag or foreign bodies are accidentally introduced.

Figure 7:
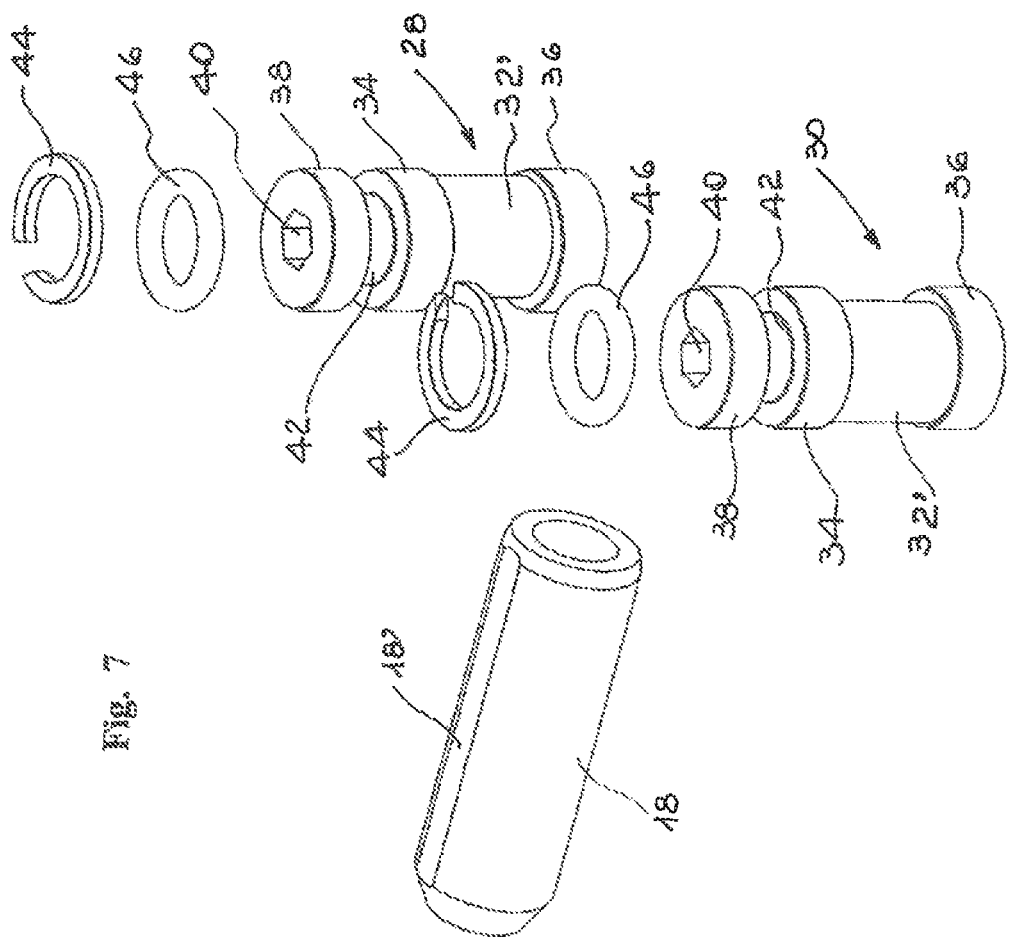
FIG. 7 shows schematically, in an exploded view, a part of the angular positioning device of the invention.

Advantageously, as may be seen in particular from FIG. 7, the cylindrical central portion 32 of each of the pins 28, 30 is offset relative to the respective upper 34 and lower bases 36, as well as with respect to the heads 38 equipped with the shaped recess 40; this offsetting, as specified in detail below, allows the cylindrical central portion of the aforementioned pins to cooperate with the plug 18 in order to allow a quick and easy positioning/angular orientation of the tool-holder 10, particularly of the front part 12 relative to the rear part 14 of said tool-holder. This angular positioning/orientation obviously occurs before the locking to each other of said parts 12 and 14 by means of the screws 20 and is facilitated by the presence of a pair of centesimal comparators, shown schematically as number 48 in FIGS. 1, 2, 3, 4 and advantageously connected by means in themselves known to the opposite sides of the rear part 14 of the tool-holder 10.

In the operating phase, the operator can easily provide for the precise angular positioning of tool-holders 10 present on the machine tool, intervening with as many spanners on both pins 28, 30 simultaneously, starting from the shaped recesses 40; such a combined rotation of the aforementioned pins, carried out before constraining said parts 12 and 14 to each other by means of the screws 20, leads the offset cylindrical central portion 32' of each of said pins to rotate in adhesion to the plug 18, fixed in the holes 16 and 16', which leads to moving and angularly orienting the front part 12 relative to the rear part 14 of the tool-holder until reaching a predetermined height. Said dimension is immediately visually detectable insofar as indicated by the movement of the hands of the two centesimal comparators 48, which signal to the operator the reaching of the desired angular position corresponding to "zero" and the consequent need to interrupt the rotation of the pins 28 and 30 with the respective spanners. At this point, the operator can block the front 12 and rear 14 parts of the tool-holder 10 to each other by means of the screws 20.

As may be seen from the above, the advantages which the invention achieves are evident.

The precise angular positioning of the tool-holder 10 suitable for multi-spindle and single-spindle numerical control lathes, on transfer machines, milling centres of any kind and, in general, on machine tools that perform machining by chip removal is performed very rapidly, with absolute precision and without requiring complex operations, to the benefit of a substantial reduction in the downtime of machining and consequently in the total costs of production.

Thanks to the interaction of the pins 28, 30 with the offset cylindrical central portion 32' and the plug 18, given the presence of the centesimal comparators 48 that report the magnitude of the combined rotation imposed on said pins, the adjustment of the angular positioning of the tool-holders is carried out with extreme ease even by non-specialized personnel.

Despite the invention having been described above with reference to one of its possible embodiments, given solely by way of a non-limiting example, numerous modifications and variants will appear evident to a person skilled in the art in the light of the above description. The present invention therefore sets out to embrace all the modifications and variants which fall within the sphere and scope of the following claims.

The invention claimed is:

1. A device for the precise angular positioning of tool-holders suitable for CNC machines, the device comprising a front part and an opposite rear part, the device further including a plug cooperating with a pair of pins arranged orthogonally relative to said plug and adjustable in rotation;
wherein a first portion of the plug is inserted in a blind hole formed in the front part of the tool-holder, and a second portion of the plug is inserted in a correspondingly aligned blind hole formed in a front area defining an embossed plate positioned on the rear part of the tool-holder; and
wherein the embossed plate of the rear part of the tool-holder has an upper surface in which a pair of bored holes are formed and have equal diameters and depths, said pair of bored holes extending vertically in said embossed plate and orthogonally relative to the plug, the pair of bored holes extending a depth exceeding beyond a diameter of the plug, and wherein the pair of pins is rotatably inserted in the pair of bored holes.

2. The device according to claim 1, wherein each of said pins comprises a cylindrical central portion and opposite cylindrical upper and lower bases of lesser height and greater diameter than said cylindrical central portion, said cylindrical central portion being offset relative to said upper and lower bases.

3. The device according to claim 2, wherein above the top base of the individual pins an integral head is provided on which a shaped recess is formed and configured to receive a spanner, which can rotate and drive said pins in clockwise or anti-clockwise rotation.

4. The device according to claim 3, wherein between the upper base and the head of the pins a notch is formed for receiving an elastic ring and an underlying seal.

5. The device according to claim 1, wherein the device further includes a pair of comparators connected to opposing lateral sides of the rear part of the tool-holder, the comparators being configured to monitor movement of the pins in clockwise and anti-clockwise rotational directions.

* * * * *